(12) United States Patent
Fujiwara et al.

(10) Patent No.: US 8,993,925 B2
(45) Date of Patent: Mar. 31, 2015

(54) ARC WELDING METHOD AND ARC WELDING APPARATUS

(75) Inventors: Junji Fujiwara, Osaka (JP); Yasushi Mukai, Osaka (JP); Atsuhiro Kawamoto, Hyogo (JP); Masaru Kowa, Osaka (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 272 days.

(21) Appl. No.: 13/143,273

(22) PCT Filed: Jul. 16, 2010

(86) PCT No.: PCT/JP2010/004619
§ 371 (c)(1),
(2), (4) Date: Jul. 5, 2011

(87) PCT Pub. No.: WO2011/013321
PCT Pub. Date: Feb. 3, 2011

(65) Prior Publication Data
US 2012/0111842 A1    May 10, 2012

(30) Foreign Application Priority Data
Jul. 29, 2009    (JP) ................................. 2009-176138

(51) Int. Cl.
*B23K 9/10* (2006.01)
*B23K 9/12* (2006.01)

(52) U.S. Cl.
CPC ...................................... *B23K 9/125* (2013.01)
USPC ................................ 219/130.33; 219/130.51

(58) Field of Classification Search
USPC .................... 219/130.33–137.51, 136–137 R
See application file for complete search history.

(56) References Cited

U.S. PATENT DOCUMENTS

| 4,441,012 | A | * | 4/1984 | Risbeck et al. ........... 219/137 R |
| 4,780,594 | A | * | 10/1988 | Rothermel ............... 219/137.71 |
| 6,207,928 | B1 | | 3/2001 | Kawamoto et al. |
| 6,627,850 | B1 | | 9/2003 | Koga et al. |
| 7,102,099 | B2 | * | 9/2006 | Huismann et al. ....... 219/130.51 |
| 8,076,611 | B2 | | 12/2011 | Kawamoto et al. |

(Continued)

FOREIGN PATENT DOCUMENTS

| CN | 1245100 A | 2/2000 |
| CN | 1665633 A | 9/2005 |

(Continued)

OTHER PUBLICATIONS

State Intellectual Property Office of People's Republic of China Search Report for Application No. 201080011034.0 dated Oct. 8, 2013.

*Primary Examiner* — Sang Y Paik
(74) *Attorney, Agent, or Firm* — RatnerPrestia

(57) ABSTRACT

An arc welding method relates to consumable electrode arc welding in which a welding wire feeding rate suitable for a welding current is determined as an average feeding rate, and the short circuit state and the arc generation state are alternately generated by changing the wire feeding periodically and repeatedly between the forward feeding and the reverse feeding. The method offers arc welding with the average feeding rate according to a welding current, a predetermined frequency, and a predetermined velocity amplitude. In the method, at least any one of the frequency and the velocity amplitude is set to a value suitable for the welding current.

14 Claims, 6 Drawing Sheets

(56) References Cited

U.S. PATENT DOCUMENTS

| | | |
|---|---|---|
| 2006/0138115 A1 | 6/2006 | Norrish et al. |
| 2007/0024273 A1 | 2/2007 | Kobayashi |
| 2007/0056944 A1 | 3/2007 | Artelsmair |
| 2008/0156781 A1 | 7/2008 | Artelsmair et al. |
| 2008/0314884 A1 | 12/2008 | Fujiwara et al. |
| 2009/0026188 A1 | 1/2009 | Schorghuber |
| 2010/0126976 A1 | 5/2010 | Kawamoto et al. |

FOREIGN PATENT DOCUMENTS

| | | |
|---|---|---|
| EP | 1 182 001 A1 | 2/2002 |
| EP | 06 76 6592 | 11/2009 |
| EP | 2 546 017 A1 | 1/2013 |
| JP | 60-187468 A | 9/1985 |
| JP | 62-6775 A | 1/1987 |
| JP | 2004-050228 A | 2/2004 |
| JP | 2004-237356 A | 8/2004 |
| JP | 2004-298924 A | 10/2004 |
| JP | 2004-298924 A | 10/2004 |
| JP | 2007-508939 A | 4/2007 |
| JP | 2007-216268 A | 8/2007 |
| JP | 2008-531283 A | 8/2008 |
| JP | 2008-542027 A | 11/2008 |
| WO | WO 00/54924 A1 | 9/2000 |
| WO | WO 03/101658 A1 | 12/2003 |
| WO | PCT/JP2006/311730 | 12/2006 |
| WO | WO 2008/108014 A1 | 9/2008 |
| WO | PCT/JP2010/004619 | 10/2010 |

* cited by examiner

ARC WELDING METHOD AND ARC WELDING APPARATUS

This application is a U.S. National Phase Application of PCT International Application PCT/JP2010/004619.

TECHNICAL FIELD

The present invention relates to a method and an apparatus of arc welding in which a short circuit state and an arc generation state are alternately generated by changing the feeding direction of a welding wire as a consumable electrode periodically between the forward feeding and the reverse feeding.

BACKGROUND ART

In the welding operation, spatter removing has been a loss process. For the purpose of reducing spatters, a consumable electrode arc welding is conventionally well known (for example, see Patent Literature 1). In the method, a short circuit state and an arc generation state are alternately generated by changing the feeding direction of a welding wire periodically and repeatedly between the forward feeding and the reverse feeding.

FIG. 7 shows a time waveform of temporal change in a wire feeding rate and a welding output.

As a method for controlling arc welding where the short circuit state and the arc generation state are alternately generated in the wire feeding of a welding wire as a consumable electrode, for example, the following is known. According to the method, the structure contains a feeding rate controller and an output controller. The feeding rate controller effects control of a wire feeding motor in a manner that wire feeding is changed periodically and repeatedly between the forward feeding and the reverse feeding. The output controller controls welding output, as shown in FIG. 7. The controller decreases the output for a small amount of wire feeding and increases the output for a large amount of wire feeding. With the structure above, separation force caused by decrease in wire feeding rate in the short circuit state encourages the melted tip of the wire to transfer to the object to be welded. The structure decreases short circuit current that is a main cause of spattering, allowing a short circuiting transfer welding to continue with stability.

In the control method above (where the short circuit state and the arc generation state are alternately generated by changing the wire feeding periodically and repeatedly between the forward feeding and the reverse feeding), the description below discusses on a case where the object to be welded and the welding wire are mechanically released from the short circuit state by the reverse feeding. To attain the mechanical release, the wire needs to be fed in reverse at a feeding rate greater than the average feeding rate of wire feeding. To obtain the desirable feeding rate, a velocity amplitude has to be determined.

It is generally known that the wire feeding rate changes in proportion to change in welding current. In the control of a wire feeding rate with a periodical change, the average feeding rate of a wire feeding rate should be changed in synchronization with (in proportion to) the welding current. As the increase in welding current, the average feeding rate increases. Therefore, the velocity amplitude of the periodic wire feeding has to be increased in synchronization with (in proportion to) the average feeding rate. Besides, when the wire feeding motor can reach the load limit during the periodic wire feeding, the load on the wire feeding motor and the peripheral parts, such as gears, should be lightened by decreasing the frequency of the periodic wire feeding.

However, if the frequency and the velocity amplitude of wire feeding cannot be changed according to welding current, welding operation is limited at a fixed welding current, that is, the welding operation has to be carried out in a limited range of welding current.

CITATION LIST

Patent Literature

Patent Literature 1: Japanese Unexamined Patent Application Publication No. 62-6775.

SUMMARY OF THE INVENTION

The present invention addresses the problem above. In the arc welding where the short circuit state and the arc generation state are periodically generated by changing the wire feeding periodically and repeatedly between the forward feeding and the reverse feeding, the method and the apparatus offer optimal welding according to a welding current.

The arc welding method of the present invention is a consumable electrode arc welding method in which a welding wire feeding rate suitable for a welding current is determined as an average feeding rate, and the short circuit state and the arc generation state are repeated periodically by changing the wire feeding between the forward feeding and the reverse feeding. The method above offers arc welding with an average feeding rate according to a welding current, a predetermined frequency, and a predetermined velocity amplitude. In the method, at least one of the frequency and the velocity amplitude is set to a value suitable for the welding current.

As described above, determining a frequency and velocity amplitude to an optimum value for each welding current allows the welding operation to be suitable for welding current. The structure minimizes the following problems: defective bead, increase in spatters, and lack of penetration. These problems can be as a result of instability of arc affected by increase in speed of welding and disturbances, such as change in wire extension and a gap between the objects to be welded. Besides, the method of the invention suppresses an adverse effect on production efficiency and working environment.

The arc welding apparatus of the present invention carries out arc welding in a manner that the arc generation state and the short circuit state are repeated alternately between a welding wire as a consumable electrode and an object to be welded. The arc welding apparatus has a welding current setting section, an average feeding rate setting section, a frequency setting section, a velocity amplitude setting section, a switching element, a welding voltage detecting section, a state detecting section, a short circuit control section, and an arc control section. The welding current setting section determines a welding current. The average feeding rate setting section determines an average feeding rate of a welding wire feeding rate for the wire feeding control in which the feeding direction of a welding wire is changed periodically and repeatedly between the forward feeding and the reverse feeding according to a welding current. The frequency setting section determines a frequency for the wire feeding control in which the feeding direction of a welding wire is changed periodically and repeatedly between the forward feeding and the reverse feeding according to a welding current. The velocity amplitude setting section determines a velocity amplitude for the wire feeding control in which the feeding direction of a welding wire is changed periodically and repeatedly between the forward feeding and the reverse feeding according to a welding current. The switching element controls welding output. The welding voltage detecting section detects welding voltage. The state detecting section detects whether the short circuit state or the arc generation state according to the result detected by the welding voltage detecting section. Receiving a short circuit signal from the state detecting section, the short circuit control section controls a short circuit current during a short circuit period that maintains the short circuit state. Receiving an arc generation signal from the state detecting section, the arc control section controls an arc voltage during an arc period that maintains the arc generation state. With the structure above, the arc welding apparatus carries out welding in which a welding wire is fed with an optimally determined frequency and velocity amplitude according to a welding current.

As described above, determining a frequency and velocity amplitude to an optimum value for each welding current allows the welding operation to be suitable for welding current. The structure minimizes the following problems: defective bead, increase in spatters, and lack of penetration. These problems can be as a result of instability of arc affected by increase in speed of welding and disturbances, such as change in wire extension and a gap between the objects to be welded. Besides, the apparatus of the invention suppresses an adverse effect on production efficiency and working environment.

In the arc welding where the short circuit state and the arc generation state are periodically generated by changing the wire feeding periodically between the forward feeding and the reverse feeding, the structure of the present invention offers an arc welding capable of determining a frequency and a velocity amplitude so as to be suitable for each welding current. This allows the welding operation to be suitable for a welding current in a broadened setting range, lightening the load on the wire feeding motor and the peripheral parts, such as gears.

DETAILED DESCRIPTION OF THE PREFERRED EMBODIMENTS

The exemplary embodiments of the present invention will be described hereinafter with reference to the accompanying drawings. Throughout the drawings, like parts have similar reference marks and the description thereof may be omitted.

It is to be understood that the present invention is not limited to the embodiments described below.

First Exemplary Embodiment

In the embodiment, the method of arc welding is described first and then the description on the arc welding apparatus follows.

Figure 1:
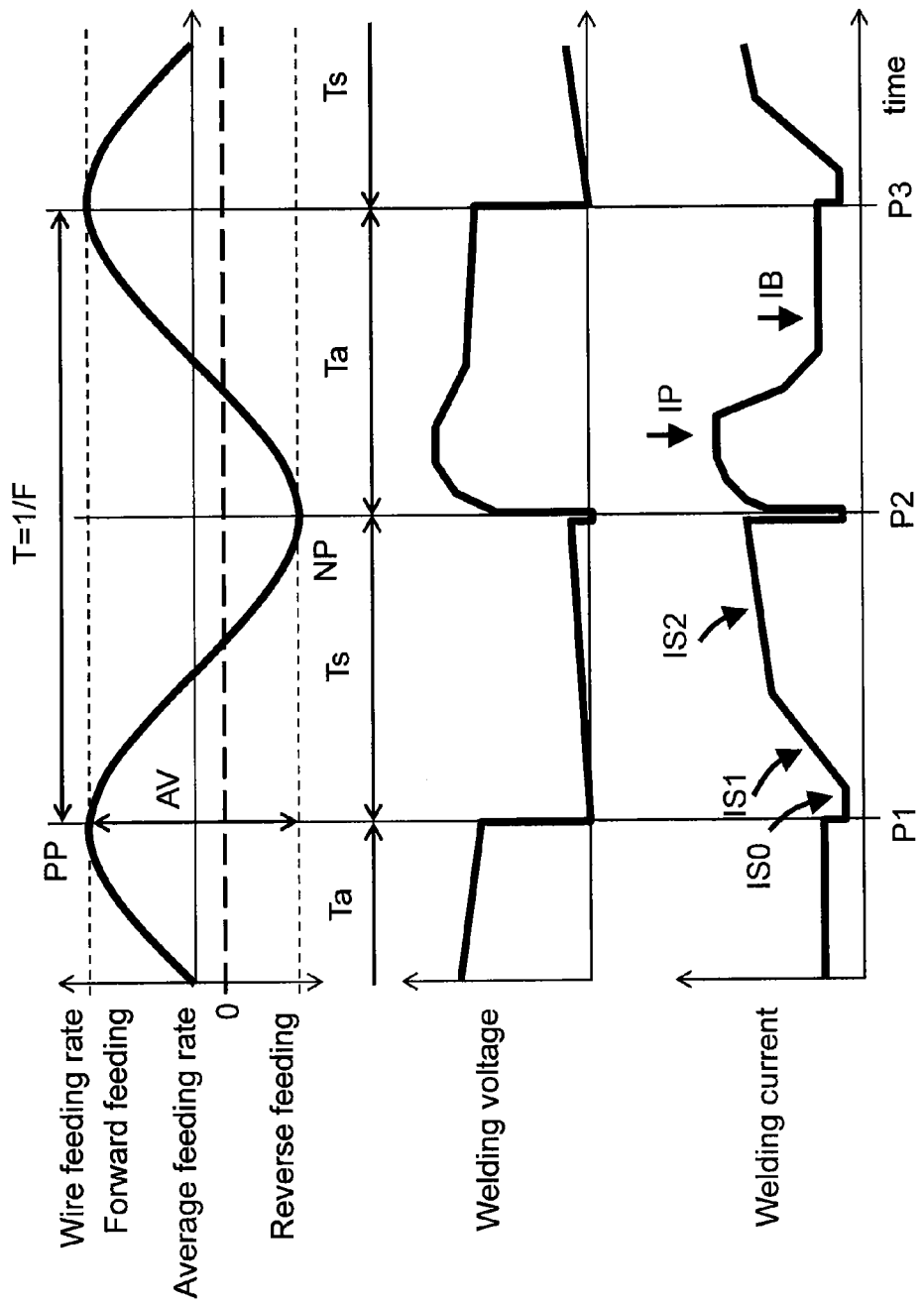
FIG. 1 shows temporal waveforms of a wire feeding rate, a welding voltage, and a welding current in accordance with a first exemplary embodiment of the present invention.

FIG. 1 shows temporal waveforms of a wire feeding rate, a welding voltage, and a welding current in accordance with the first exemplary embodiment of the present invention. Specifically, the waveforms of FIG. 1 show the temporal relation of the wire feeding rate, the welding voltage, and the welding current in a consumable electrode arc welding where the short circuit state and the arc generation state are alternately generated.

In FIG. 1, P1 represents the moment from which the short circuit state starts. First, initial short circuit current IS0 is provided for a predetermined time. After that, initial short circuit current IS0 is changed into a short circuit current having a first-increase gradient ($di_1/dt$) (hereinafter, referred to as IS1 shown in FIG. 1), and further changed into a short circuit current having a second-increase gradient ($di_2/dt$) (hereinafter, IS2 shown in FIG. 1). When a constriction is detected in a droplet formed between the molten pool and the tip of the welding wire, the welding current is plunged into a low level. After that, the droplet is separated at the constriction and the short circuit state completes. P2 in FIG. 1 represents the moment at which an arc is generated and from which arc period Ta starts. The welding current provided just after the arc generation is peak current IP. After that, the welding current is changed from peak current IP to base current IB. The transition period from peak current IP to base current IB is controllable by either current or voltage. The welding operation waits for the next short circuit, with base current IB maintained. P3 in FIG. 1 represents the moment at which the next short circuit occurs and from which short circuit period Ts starts.

FIG. 1 shows a feeding control in which the wire feeding is changed periodically and repeatedly between the forward feeding and the reverse feeding in the basic form of a sine wave with predetermined frequency F and predetermined velocity amplitude AV. Period T, which is the reciprocal of frequency F, is the total of short circuit period Ts and arc period Ta. When the wire feeding rate reaches peak PP of the forward feeding, a short circuit is generated around P1; in contrast, when the wire feeding rate reaches peak NP of the reverse feeding, an arc is generated around P2. After P2, the next short circuit is generated around P3 when the wire feeding rate reaches peak PP of the next forward feeding.

As described above, the period between P1 and P3 as one cycle of feeding control is continuously repeated to carry out the welding. The short circuit state and the arc generation state are generated by the wire feeding control where the wire feeding is changed periodically and repeatedly between the forward feeding and the reverse feeding.

Figure 2:
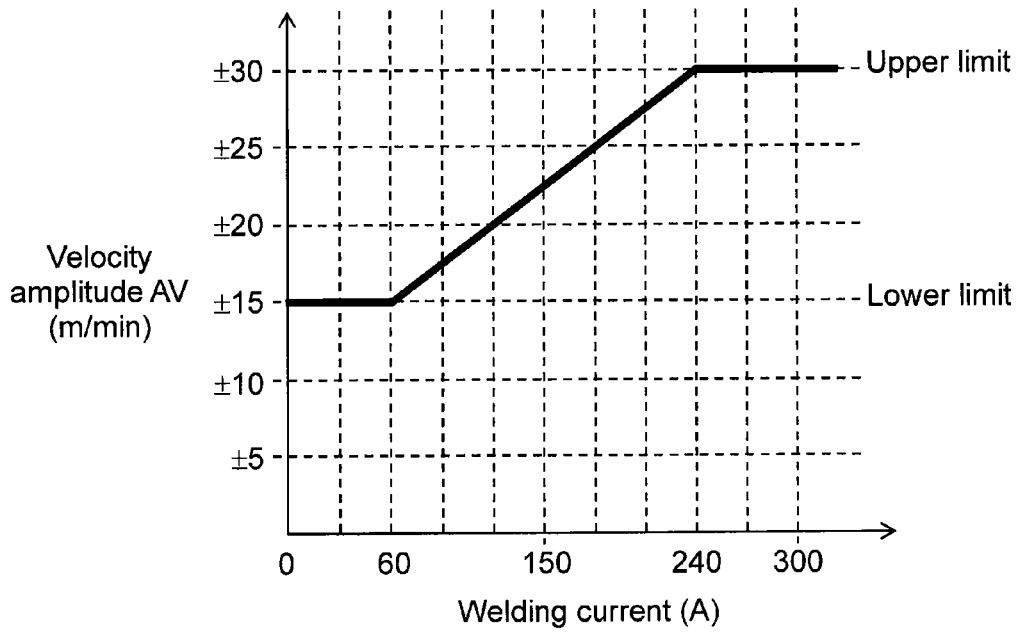
FIG. 2 shows a relation between the welding current and the velocity amplitude of a wire feeding rate in accordance with the first embodiment of the present invention.

Next, in the welding above, how to determine velocity amplitude AV being suitable for a welding current will be described, with reference to FIG. 2. FIG. 2 shows a relation between the welding current and the velocity amplitude of a wire feeding rate in accordance with the first embodiment of the present invention.

In FIG. 2, for example, velocity amplitude AV measures 15 m/min for a welding current of 60 A. As increase in welding current, velocity amplitude AV increases. When the welding current reaches 240 A, the velocity amplitude increases to 30 m/min. Increase in welding current also increases the average feeding rate of the wire feeding rate. Therefore, if velocity amplitude AV has a fixed value, the period for the reverse feeding is decreased; accordingly, the distance of the reverse feeding is shortened. Due to the decrease in distance of the reverse feeding, it is difficult to keep a distance between the tip of the wire and the object to be welded. To provide the reverse feeding with stability, a predetermined distance (e.g. 1-5 mm) between the tip of the wire and the object should be constantly maintained even if the welding current gets higher. That is, the period for the reverse feeding of the welding wire (i.e., the distance of the reverse feeding) is kept at a predetermined length by increasing velocity amplitude AV in synchronization with the welding current.

The characteristics shown in FIG. 2 can be known in advance by an experiment according to an object to be welded and welding conditions.

Figure 3:
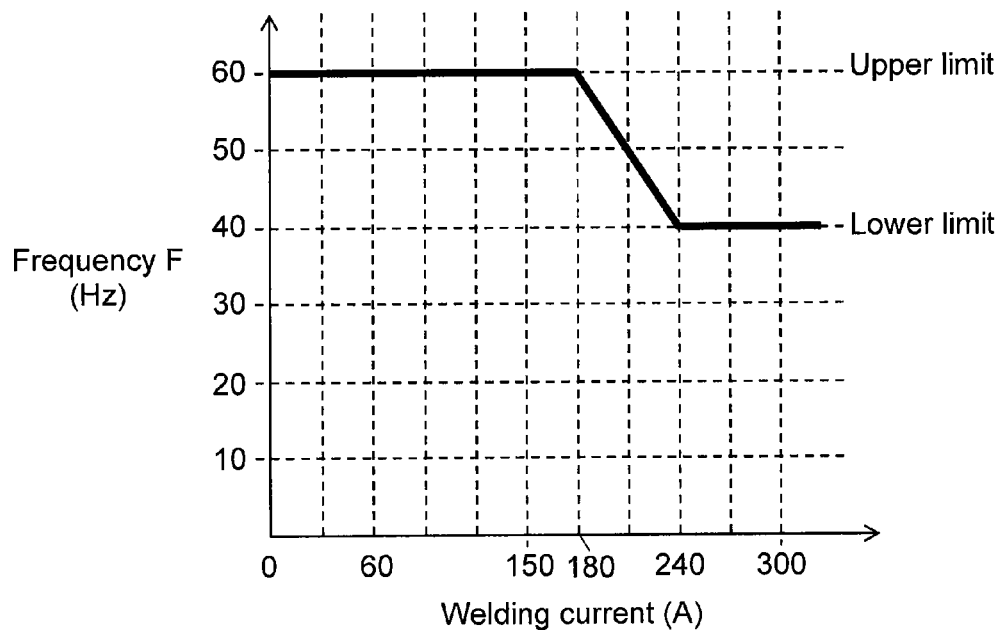
FIG. 3 shows a relation between the welding current and the frequency of wire feeding in accordance with the first embodiment of the present invention.

Next, in the welding above (where the wire feeding is changed periodically and repeatedly between the forward feeding and the reverse feeding), how to determine frequency F being suitable for a welding current will be described, with reference to FIG. 3. FIG. 2 shows a relation between the welding current and the velocity amplitude of the wire feeding in accordance with the first embodiment of the present invention. FIG. 3 shows a relation between the welding current and the frequency of the wire feeding in accordance with the first embodiment of the present invention.

In FIG. 3, for example, the frequency is constantly kept at 60 Hz until the welding current reaches 180 A. When the welding current exceeds 180 A, the frequency is set lower. Further, when the welding current reaches 240 A, the frequency may be set lower down to 40 Hz.

As described above, velocity amplitude AV needs to have a larger value with the increase in welding current; in contrast, frequency F may be set low. The increase in velocity amplitude also increases the rate of change of welding wire feeding rate (i.e. acceleration of welding wire feeding), which needs for the wire feeding motor and the gears to have great power for feeding the welding wire. This imposes a heavy load on the wire feeding motor, the gears and other peripheral parts. Determining frequency F to be low suppresses an excessive change in welding wire feeding rate, lightening the load.

In a case where the wire feeding motor and the peripheral parts including gears are insusceptible to the load, frequency F may be kept at a constant level or may be increased to a higher level.

In FIGS. 2 and 3, for example, as the welding current increases to 180 A, velocity amplitude AV increases from 15 m/min to 25 m/min; meanwhile, frequency F is kept at 60 Hz with no trouble. As the welding current gets higher to 240 A, velocity amplitude AV increases to 30 m/min. Under the condition, frequency F is often lowered to 40 Hz for protecting the wire feeding motor and the periphery parts including gears from an excessive load.

In the description, the relation between the welding current and velocity amplitude AV (FIG. 2) and the relation between the welding current and frequency F (FIG. 3) are shown as linear functions, but they are not limited to; they may be represented by quadratic functions.

As shown in FIGS. 2 and 3, at least one of the upper limit and the lower limit may be defined in each of velocity amplitude AV and frequency F with respect to the welding current. For example, setting the upper limit assures safety use of the wire feeding motor without exceeding the service limit. Setting the lower limit allows the welding operation to maintain desirable welding properties and welding conditions.

Velocity amplitude AV and frequency F shown in FIGS. 2 and 3 are determined according to the welding current and at least any one of the followings: the diameter of a feeding wire as a consumable electrode, the type of wire, wire extension, and a shield gas to be supplied.

As described above, the arc welding method of the present invention is a consumable electrode arc welding in which method a welding wire feeding rate suitable for a welding current is determined as an average feeding rate, and the short circuit state and the arc generation state are repeated periodically by changing the wire feeding between the forward feeding and the reverse feeding. The method above carries out wire feeding with an average feeding rate according to a welding current, predetermined frequency F, and predetermined velocity amplitude AV. In the method, at least one of frequency F and velocity amplitude AV is set to a value suitable for the welding current.

Determining frequency F and velocity amplitude AV to an optimum value for each welding current allows the welding operation to be suitable for the welding current. The structure minimizes the following problems: defective bead, increase in spatters, and lack of penetration. These problems can be as a result of instability of arc affected by increase in speed of welding and disturbances, such as change in wire extension and a gap between the objects to be welded. Besides, the method of the invention suppresses an adverse effect on production efficiency and working environment.

In the wire feeding, the welding wire feeding rate can be changed in the form of a sine wave. Compared to a rectangular change in feeding rate, the sinusoidal change decreases temporal change in load on the wire feeding motor and the peripheral parts including gears, contributing to an extended service life thereof.

In the welding method of the invention, the welding operation may be timed to at least any one of the peak time, the rising time, and the falling time of the welding wire feeding rate. The method above allows the arc welding to be controllable with stability. Specifically, the method prevents generation of excessive spatters and unstable arc, providing the welding operation with stability.

Further, in the method above, at least one of the upper limit and the lower limit may be determined in at least any one of the peak time, the rising time, and the falling time of the welding wire feeding rate. Setting a limit value assures safety use of the wire feeding motor and other parts, and maintains desirable welding properties and welding conditions in the welding operation.

Figure 4:
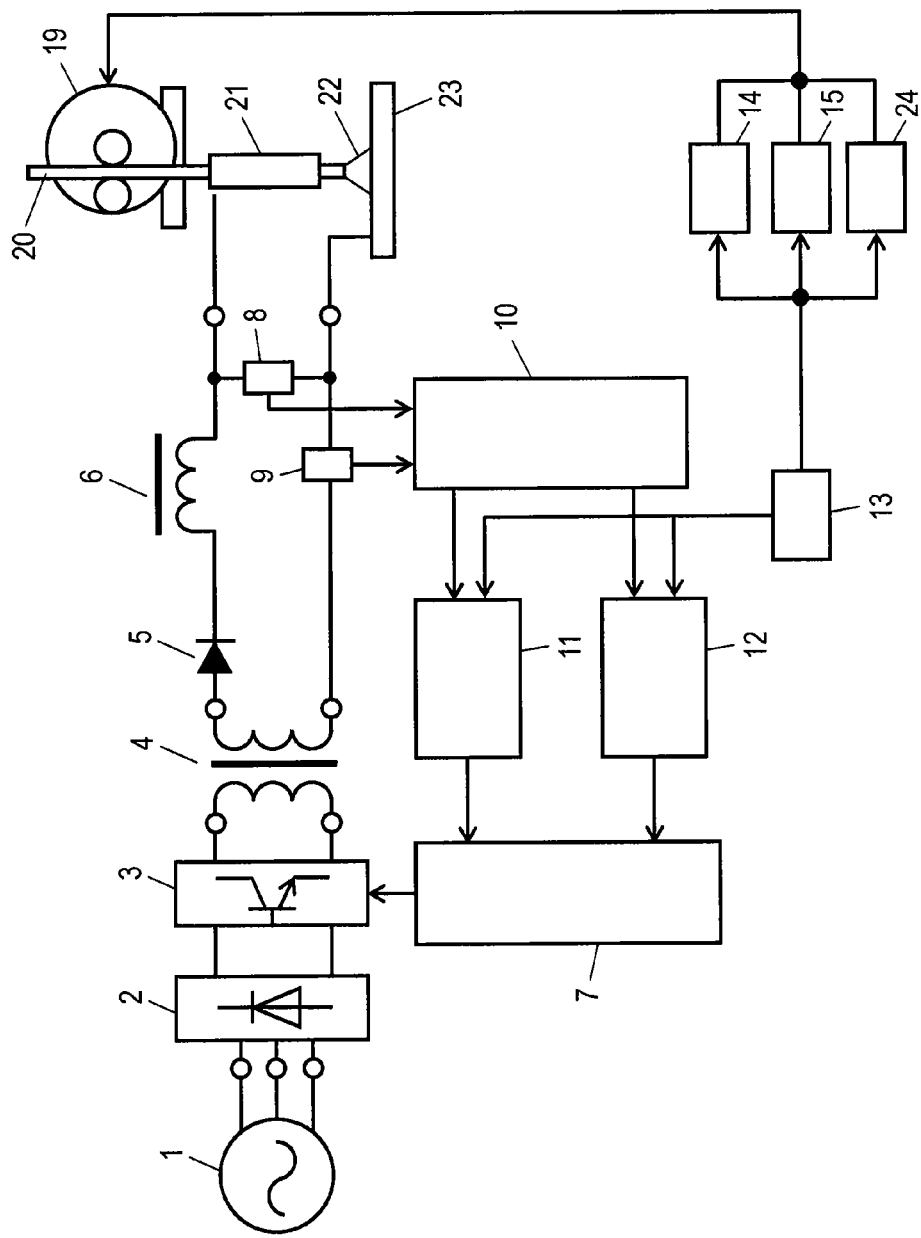
FIG. 4 is a schematic view showing the structure of an arc welding apparatus in accordance with the first embodiment of the present invention.

Next, the arc welding apparatus that carries out the arc welding control of the first exemplary embodiment will be described with reference to FIG. 4. FIG. 4 is a schematic view showing the structure of the arc welding apparatus in accordance with the first embodiment of the present invention.

As shown in FIG. 4, the arc welding apparatus of the embodiment carries out arc welding in a manner that the arc generation state and the short circuit state are repeated alternately between welding wire 20 as a consumable electrode and object 23 to be welded. The arc welding apparatus has welding current setting section 13, average feeding rate setting section 24, frequency setting section 14, velocity amplitude setting section 15, switching element 3, welding voltage detecting section 8, state detecting section 10, short circuit control section 11, and arc control section 12. With the structure, the welding apparatus carries out arc welding in which the feeding of welding wire 20 is controlled with frequency F and velocity amplitude AV suitable for a welding current. Welding current setting section 13 determines a welding current. Average feeding rate setting section 24 determines an average feeding rate of a welding wire feeding rate for the wire feeding control in which the feeding direction of welding wire 20 is changed periodically and repeatedly between the forward feeding and the reverse feeding according to a welding current. Frequency setting section 14 determines frequency F for the wire feeding control in which the feeding direction of welding wire 20 is changed periodically and repeatedly between the forward feeding and the reverse feeding according to a welding current. Velocity amplitude setting section 15 determines velocity amplitude AV for the wire feeding control in which the feeding direction of welding wire 20 is changed periodically and repeatedly between the forward feeding and the reverse feeding according to a welding current. Switching element 3 controls welding output. Welding voltage detecting section 8 detects welding voltage. State detecting section 10 detects whether the arc welding is in the short circuit state or in the arc generation state according to the result detected by welding voltage detecting section 8. Receiving a short circuit signal from state detecting section 10, short circuit control section 11 controls a short circuit current during short circuit period Ts that maintains the short circuit state. Receiving an arc generation signal from state detecting section 10, arc control section 12 controls an arc voltage during arc period Ta that maintains the arc generation state. By virtue of the structure above, the apparatus employs a frequency and a velocity amplitude suitable for each welding current, providing optimum welding operation for each welding current (as will be described later). The structure minimizes the following problems: defective bead, increase in spatters, and lack of penetration. These problems can be as a result of instability of arc affected by increase in speed of welding and disturbances, such as change in wire extension and a gap in object 23 to be welded. Besides, the structure suppresses an adverse effect on production efficiency and working environment, providing an excellent arc welding apparatus.

Next, the basic workings of the arc welding apparatus of the embodiment will be described. As shown in FIG. 4, electric power fed from input power source 1 is rectified by primary rectifier 2 and then converted into, for example, AC voltage by switching element 3. The AC voltage is stepped down by transformer 4 and then rectified by secondary rectifier 5 and inductor DCL 6. The AC voltage is applied between welding wire 20 guided by welding tip 21 and object 23 to be welded, by which welding arc 22 is generated on object 23 to be welded.

The arc welding apparatus has driving section 7, welding voltage detecting section 8, and welding current detecting section 9. Driving section 7 controls switching element 3. Welding voltage detecting section 8 is connected between the output terminals of welding power source that applies DC voltage to welding wire 20. Welding current detecting section 9 detects welding output current. The arc welding apparatus has, as mentioned above, state detecting section 10, short circuit control section 11, arc control section 12, and welding current setting section 13 for setting a welding current. State detecting section 10 judges whether the short circuit state or the arc generation state according a signal from welding voltage detecting section 8. Receiving a short circuit signal from state detecting section 10, short circuit control section 11 controls a short circuit current during short circuit period Ts. Receiving an arc generation signal from state detecting section 10, arc control section 12 controls an arc voltage during arc period Ta.

Frequency setting section 14 determines frequency F for the wire feeding so as to be suitable for each current determined by welding current setting section 13. Velocity amplitude setting section 15 determines velocity amplitude AV for the wire feeding. Average feeding rate setting section 24 determines an average feeding rate of the wire feeding. Receiving each output of frequency setting section 14, velocity amplitude setting section 15, and average feeding rate setting section 24, wire feeding motor 19 carries out feeding control of welding wire 20. Frequency setting section 14 has a correspondence table or a relational expression between the welding current and frequency F. With reference to the table (or the expression), frequency setting section 14 determines frequency F to be suitable for a welding current. Velocity amplitude setting section 15 has a correspondence table or a relational expression between the welding current and velocity amplitude AV. With reference to the table (or the expression), velocity amplitude setting section 15 determines velocity amplitude AV to be suitable for a welding current. Average feeding rate setting section 24 has a correspondence table or a relational expression between the welding current and an average feeding rate. With reference to the table (or the expression), average feeding rate setting section 24 determines an average feeding rate to be suitable for a welding current.

First, a specific description on the wire feeding control of the arc welding apparatus will be given below. Receiving each welding current determined by welding current setting section 13, each of frequency setting section 14 and velocity amplitude setting section 15 outputs a wire-feeding-rate command to wire feeding motor 19. The wire-feeding-rate command requests wire feeding motor 19 to repeat the forward feeding and the reverse feeding in the form of a sine wave with frequency F and velocity amplitude AV according to the average feeding rate of the wire feeding rate suitable for a determined value of welding current. As described above, the relation between the welding current and frequency F and the relation between the welding current and velocity amplitude AV are stored in a storage section (not shown) as a correspondence table or expression, so that frequency F and velocity amplitude AV have optimum values for the welding current.

Next, a specific description on the welding control of the arc welding apparatus will be given below. As is shown in FIG. 4, welding voltage detecting section 8, which is connected between the output terminals of the arc welding apparatus, detects welding voltage and then outputs a signal corresponding to the voltage to state detecting section 10. Receiving the signal from welding voltage detecting section 8, state detecting section 10 judges whether the welding output voltage is at least a predetermined value or less than the value. According to the result, state detecting section 10 judges whether the short circuit state—where welding wire 20 makes contact with object 23 to be welded—or the arc generation state—where a welding arc is generated between the wire and the object having no contact with each other. According to the judgment, state detecting section 10 outputs a judgment signal to short circuit control section 11 and arc control section 12.

Receiving the judgment signal, short circuit control section 11 requests for driving section 7 to output short circuit initial current IS0 suitable for the welding current, first-increase gradient IS1 of a short circuit current that follows initial current IS0, and second-increase gradient IS2 of the short circuit current that follows gradient IS1.

Receiving the judgment signal, arc control section 12 requests for driving section 7 to output peak current IP and base current IB for a predetermined period of time in arc period Ta. The transition period from peak current IP to base current IB is controllable by either current or voltage.

With the structure above, frequency F and velocity amplitude AV can be determined to be suitable for a welding current in arc welding where the wire feeding is changed periodically and repeatedly between the forward feeding and the reverse feeding. This allows welding operation to have a desired current value in a broadened range from a low level (e.g. 30 A) to a high level (e.g. 350 A) of welding current.

Each section that constitutes the arc welding apparatus of FIG. 4 may be a separate structure or a combined structure of some sections.

As described above, the arc welding apparatus of the embodiment carries out welding operation in which the short circuit state and the arc generation state are repeated periodically by changing the wire feeding periodically and repeatedly between the forward feeding and the reverse feeding in the form of a sine wave. In such a controlled welding operation, frequency F and velocity amplitude AV are determined according to the average feeding rate of a wire feeding rate suitable for the welding current. The structure provides arc welding with stability and a broadened range from a low level to a high level in welding current.

In a case where the wire feeding is changed between the forward feeding and the reverse feeding in the form of a sine wave, the temporal change in load on the wire feeding motor and the peripheral parts including gears is continuous and small. In contrast, when the forward feeding and the reverse feeding are repeated in the form of a rectangular wave, the temporal change in load on the motor and the peripheral parts can be sudden and large. Compared to the rectangular change in feeding rate, the sinusoidal change decreases temporal change in load on the components, contributing to an extended service life thereof.

In the description of the embodiment, frequency F and velocity amplitude AV for the wire feeding are determined on the basis of the welding current, but it is not limited to. As a welding current increases, a wire feeding rate and an amount of wire feeding proportionally increase. Therefore, a similar effect can be obtained by determining frequency F and velocity amplitude AV on the basis of the wire feeding rate or the amount of wire feeding.

Second Exemplary Embodiment

Figure 5:
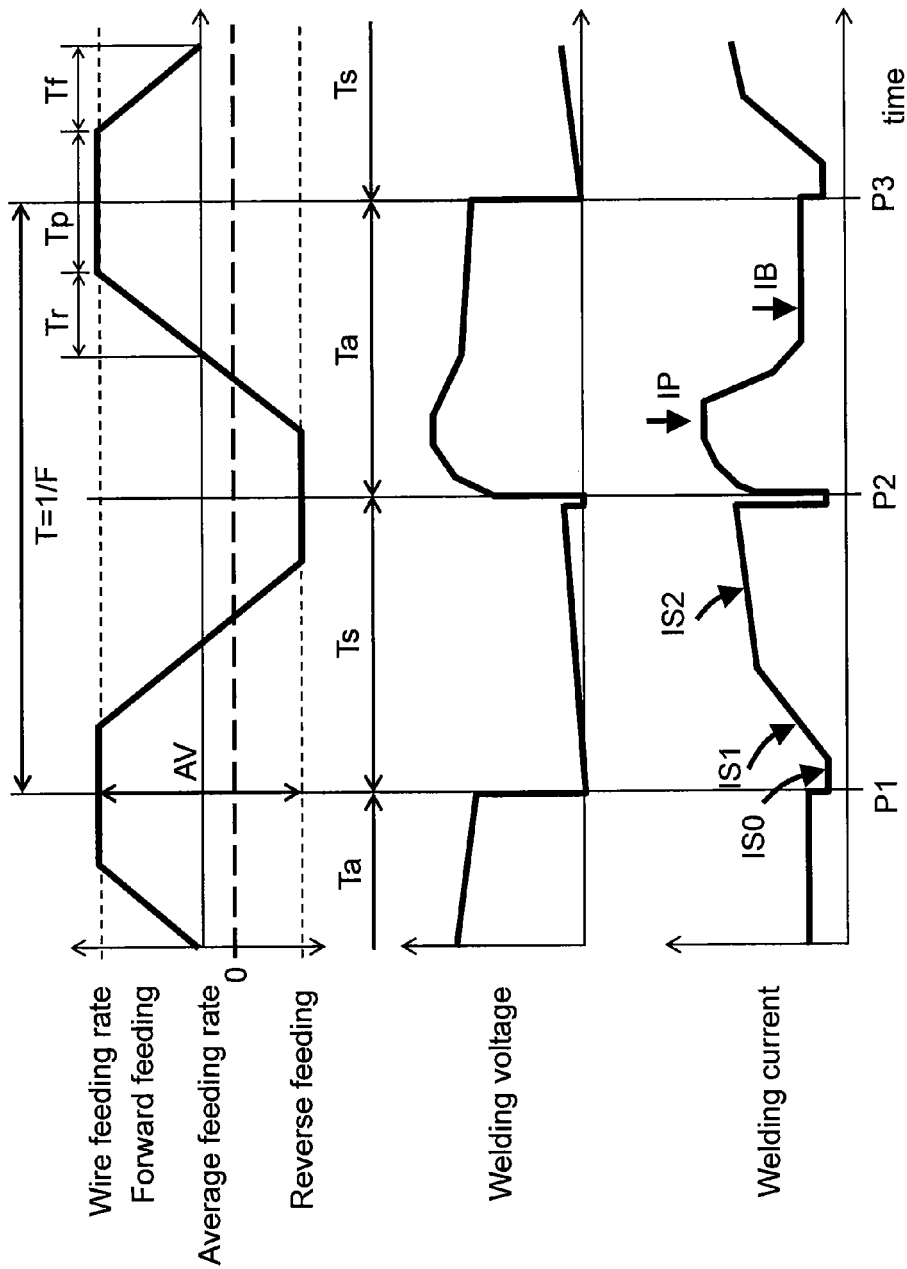
FIG. 5 shows temporal waveforms of a wire feeding rate, a welding voltage, and a welding current in accordance with a second exemplary embodiment of the present invention.

FIG. 5 shows temporal waveforms of a wire feeding rate, a welding voltage, and a welding current in accordance with the second exemplary embodiment of the present invention.

The structure of the second embodiment differs from that of the first embodiment in the following points: the wire feeding is changed in the form of a trapezoid wave, not in the form of a sine wave; and at least any one of peak time Tp, rising time Tr, and falling time Tf of the trapezoidal waveform in the wire feeding control is determined so as to be suitable for welding current.

That is, the arc welding method of the second embodiment is a consumable electrode arc welding in which a welding wire feeding rate suitable for a welding current is determined as an average feeding rate, and the short circuit state and the arc generation state are repeated periodically by changing the wire feeding periodically and repeatedly between the forward feeding and the reverse feeding. The method above carries out wire feeding with the average feeding rate, predetermined frequency F, and predetermined velocity amplitude AV. In the method, at least one of frequency F and velocity amplitude AV is set to a value suitable for the welding current, and the wire feeding is controlled on the wire feeding rate changed in the form of a trapezoid waveform.

Determining frequency F and velocity amplitude AV to an optimum value for each welding current allows the welding operation to be suitable for the welding current. The structure minimizes the following problems: defective bead, increase in spatters, and lack of penetration. These problems can be as a result of instability of arc affected by increase in speed of welding and disturbances, such as change in wire extension and a gap in the object to be welded. Besides, the method of the invention suppresses an adverse effect on production efficiency and working environment, providing excellent arc welding.

In the wire feeding control where the forward feeding and the reverse feeding are periodically repeated with a predetermined frequency F and velocity amplitude AV, employing a wire feeding rate having a trapezoidal change offers an effect similar to that having a sinusoidal change.

Unlike the control employing a wire feeding rate with a sinusoidal change, in the control employing a wire feeding rate with a trapezoidal change, peak time Tp, rising time Tr, and falling time Tf of the trapezoidal waveform can be determined to be suitable for a welding current.

FIG. 5 shows a wire feeding control in which the forward feeding and the reverse feeding are periodically repeated, with predetermined frequency F and velocity amplitude AV, in the form of a trapezoid wave as a basic waveform. In the wire feeding control, peak time Tp is disposed at the peak on the side of the forward feeding or the reverse feeding. Further, rising time Tr required for reaching the peak feeding rate and falling time Tf from the peak feeding rate are added, and they can be determined to be suitable for a welding current.

By virtue of increase in number of adjustable parameters, the distance between welding wire 20 and object 23 to be welded is easily kept at a predetermined length.

The relation between the welding current and peak time Tp, the relation between the welding current and rising time Tr, and the relation between the welding current and falling time Tf—which are not shown in the drawings, though—may be represented by linear functions or quadratic functions.

Further, at least one of the upper limit and the lower limit may be defined at least any one of peak time Tp, rising time Tr, and falling time Tfe with respect to the welding current (which are also not shown in the drawings).

Peak time Tp, rising time Tr, and falling time Tf are determined according to the welding current and at least any one of the followings: the diameter of a feeding wire as a consumable electrode, the type of wire, wire extension, and a shield gas to be supplied.

Figure 6:
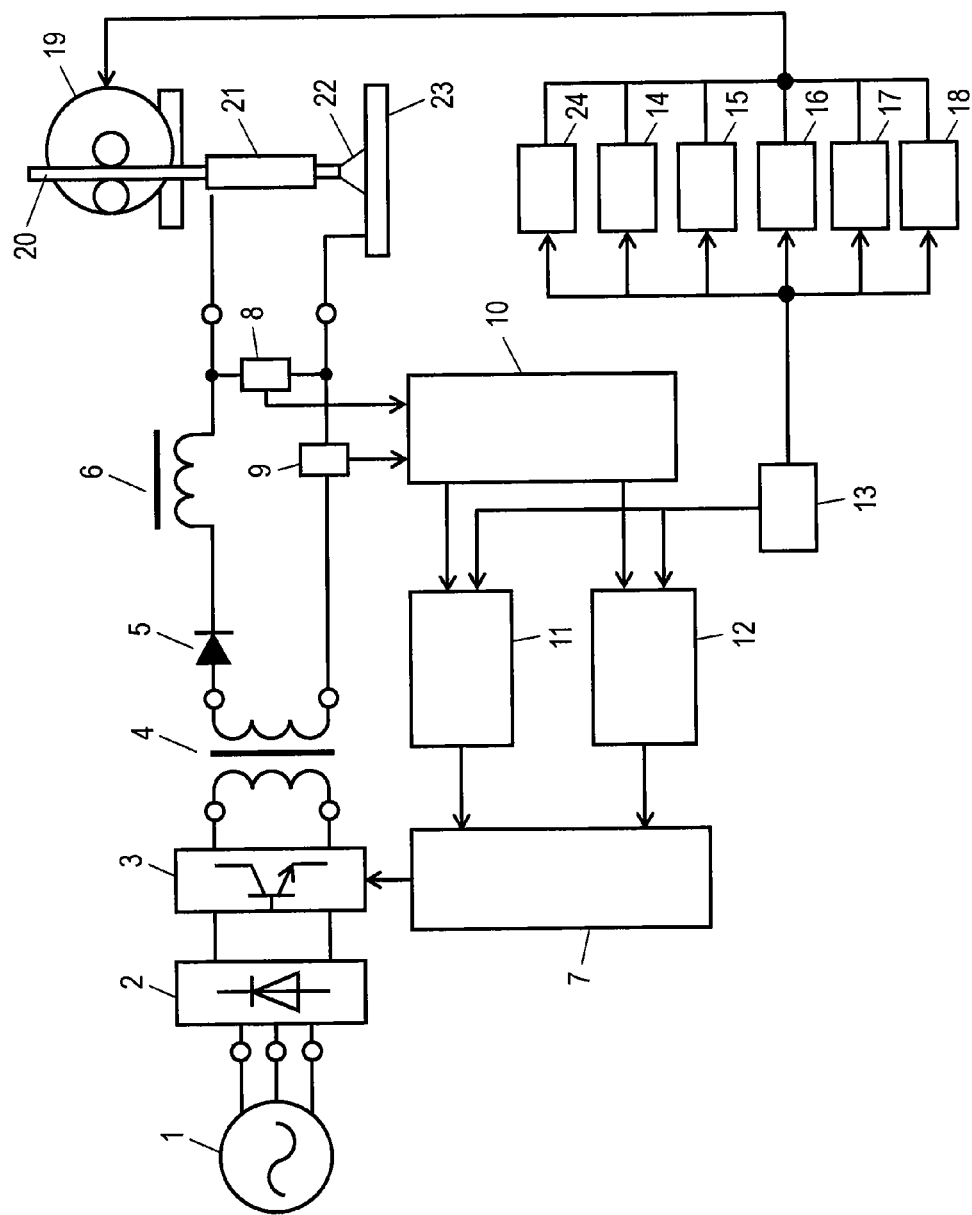
FIG. 6 is a schematic view showing the structure of an arc welding apparatus in accordance with the second embodiment of the present invention.
Figure 7:
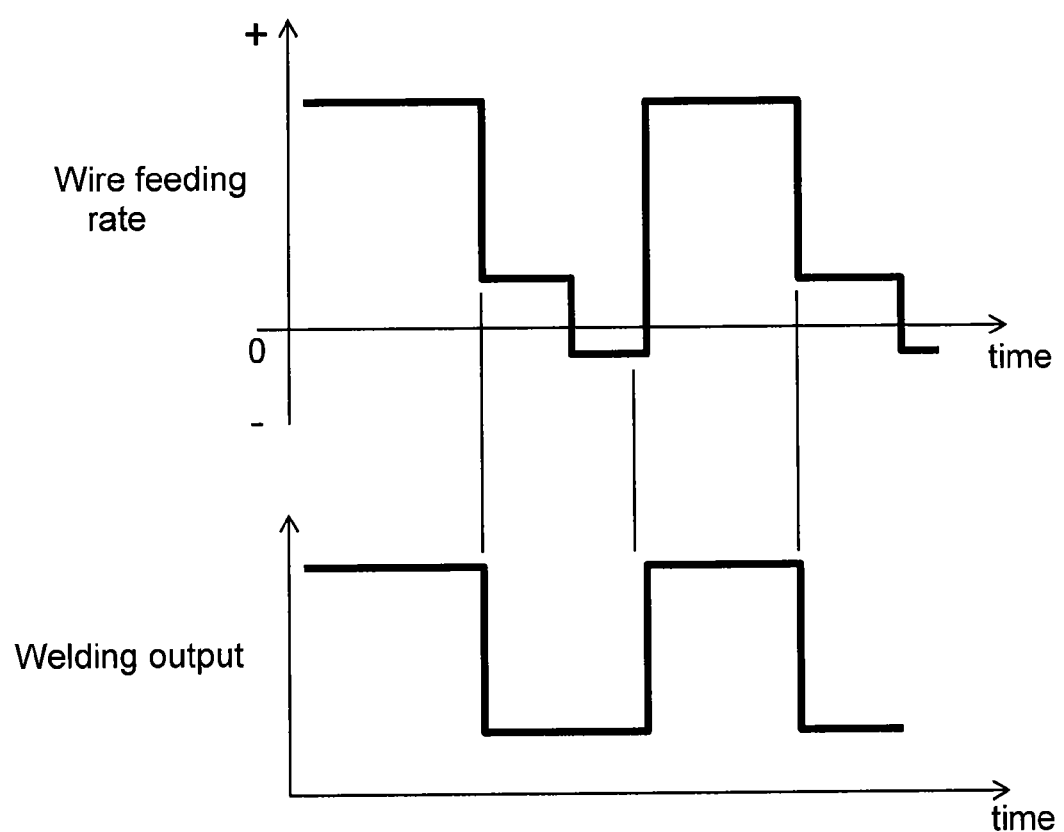
FIG. 7 shows conventional temporal waveforms of a wire feeding rate and welding output.

Next, a specific description on the welding control of the arc welding apparatus of the second embodiment will be given below, with reference to FIG. 6. FIG. 6 is a schematic view showing the structure of the arc welding apparatus of the second embodiment of the present invention. The arc welding apparatus of the second embodiment differs from that described in the first embodiment (shown in FIG. 4) in that peak time setting section 16, rising time setting section 17, and falling time setting section 18 are additionally disposed.

In addition to the workings of the arc welding apparatus (shown in FIG. 4) of the first embodiment, the arc welding apparatus of the embodiment works as follows. Average feeding rate setting section 24 determines an average feeding rate for the feeding control in which the feeding of welding wire 20 is repeated periodically between the forward feeding and the reverse feeding in the form of a trapezoid wave. Velocity amplitude setting section 15 determines a velocity amplitude for the feeding control in which the feeding of welding wire 20 is repeated periodically between the forward feeding and the reverse feeding in the form of a trapezoid wave. The arc welding apparatus of the embodiment has peak time setting section 16, rising time setting section 17, and falling time setting section 18. With the structure above, the apparatus carries out arc welding in a manner that the feeding of welding wire 20 is timed to at least any one of peak time Tp, rising time Tr, and falling time Tf with respect to the welding current. Peak time setting section 16 determines peak time Tp of the trapezoid waveform according to the welding current. Rising time setting section 17 determines rising time Tr of the trapezoid waveform according to the welding current. Falling time setting section 18 determines falling time Tf of the trapezoid waveform according to the welding current.

Determining a frequency and a velocity amplitude to an optimum value for each welding current allows the welding operation to be suitable for the welding current. The structure minimizes the following problems: defective bead, increase in spatters, and lack of penetration. These problems can be as a result of instability of arc affected by increase in speed of welding and disturbances, such as change in wire extension and a gap formed in object 23 to be welded. Besides, the structure of the invention suppresses an adverse effect on production efficiency and working environment, providing an excellent arc welding apparatus.

Peak time setting section 16 determines peak time Tp so as to be suitable for each welding current determined at welding current setting section 13. Rising time setting section 17 determines rising time Tr. Falling time setting section 18 determines falling time Tf. Receiving each output of peak time setting section 16, rising time setting section 17, and falling time setting section 18, wire feeding motor 19 carries out feeding control of welding wire 20.

Peak time setting section 16 has a correspondence table or a relational expression between the welding current and peak time Tp. With reference to the table (or the expression), peak time setting section 16 determines peak time Tp to be suitable for a welding current. Rising time setting section 17 has a correspondence table or a relational expression between the welding current and rising time Tr. With reference to the table (or the expression), rising time setting section 17 determines rising time Tr to be suitable for a welding current. Falling time setting section 18 has a correspondence table or a relational expression between the welding current and falling time Tf. With reference to the table (or the expression), falling time setting section 18 determines falling time Tf to be suitable for a welding current.

Next, wire feeding control of the arc welding apparatus will be described below. Each of peak time setting section 16, rising time setting section 17, and falling time setting section 18, which are responsible for controlling the wire feeding in the form of trapezoid wave, outputs a wire-feeding-rate command to wire feeding motor 19. The wire-feeding-rate command requests wire feeding motor 19 to repeat the forward feeding and the reverse feeding in the form of a trapezoid wave with peak time Tp, rising time Tr, and falling time Tf according to each welding current determined at welding current setting section 13.

The welding control of the arc welding apparatus is similar to that in the first embodiment, and the description thereof will be omitted.

As described above, in the welding control of the embodiment in which the short circuit state and the arc generation state are periodically generated by changing the wire feeding rate periodically and repeatedly between the forward feeding and the reverse feeding in the form of a trapezoid wave, frequency F, velocity amplitude AV, peak time Tp, rising time Tr, and falling time Tf can be determined so as to be suitable for the average feeding rate of a wire feeding rate according to each welding current. This allows welding operation to have a desired current value in a broadened range from a low level (e.g. 30 A) to a high level (e.g. 350 A) of the welding current.

According to the structure of the embodiment, the wire feeding is changed between the forward feeding and the reverse feeding in the form of a trapezoid wave. Compared to a rectangular change in feeding rate, the trapezoidal change decreases temporal change in load on wire feeding motor 19 and the peripheral parts including gears, contributing to an extended service life thereof.

In the description of the embodiment, peak time Tp, rising time Tr, and falling time Tf are determined on the basis of the welding current, but it is not limited to. As a welding current increases, a wire feeding rate and an amount of wire feeding proportionally increase. Therefore, a similar effect can be obtained by determining peak time Tp, rising time Tr, and falling time Tf on the basis of the wire feeding rate or the amount of wire feeding.

Each section that constitutes the arc welding apparatus of FIG. 6 may be a separate structure or a combined structure of some sections.

INDUSTRIAL APPLICABILITY

The structure of the present invention minimizes the following problems: defective bead, increase in spatters, and lack of penetration. These problems can be as a result of instability of arc affected by increase in speed of welding and disturbances, such as change in wire extension and a gap between the objects to be welded. The structure suppresses an adverse effect on production efficiency and working environment. The method and apparatus of arc welding is useful for consumable electrode arc welding; particularly, useful for high-speed sheet welding in car industries.

REFERENCE MARKS IN THE DRAWINGS 1 input power source
2 primary rectifier
3 switching element
4 transformer
5 secondary rectifier
6 DCL
7 driving section
8 welding voltage detecting section
9 welding current detecting section
10 state detecting section
11 short circuit control section
12 arc control section
13 welding current setting section
14 frequency setting section
15 velocity amplitude setting section
16 peak time setting section
17 rising time setting section
18 falling time setting section
19 wire feeding motor
20 welding wire
21 welding tip
22 welding arc
23 object to be welded
24 average feeding rate setting section

The invention claimed is:

1. An arc welding method comprising:
a setting step for setting a set welding current;
a determining step for determining a welding wire feeding rate having an average feeding rate, a frequency and a velocity amplitude, and
a welding step for welding with a short-circuit state and an arc generation state repeated periodically by periodically changing wire feeding of a consumable welding wire between forward feeding and reverse feeding at the welding wire feeding rate, electric power being applied to the consumable welding wire to melt the consumable welding wire during the welding, wherein in the determining step, which occurs prior to the welding step, the average feeding rate is determined as a predetermined average feeding rate based on the set welding current, in the determining step, which occurs prior to the welding step, the frequency is determined as a predetermined frequency based on the set welding current, and in the welding step, welding is performed at the welding wire feeding rate including the predetermined average feeding rate and the predetermined frequency.

2. The arc welding method of claim 1, wherein at least one of an upper limit and a lower limit is set in the predetermined frequency.

3. The arc welding method of claim 1, wherein the welding wire feeding rate has a sinusoidal waveform.

4. The arc welding method of claim 1, wherein the welding wire feeding rate has a trapezoidal waveform.

5. The arc welding method of claim 4, wherein welding operation is timed to at least any one of a peak time, a rising time, and a falling time of the welding wire feeding rate determined based on the set welding current in the determining step.

6. The arc welding method of claim 5, wherein at least one of an upper limit and a lower limit is set in at least any one of the peak time, the rising time, and the falling time.

7. An arc welding apparatus that carries out arc welding where an arc generation state and a short circuit state are repeated alternately between a consumable welding wire and an object to be welded, the apparatus comprising:

a welding current setting section for determining a set welding current;

an average feeding rate setting section for determining, prior to a welding operation, an average feeding rate of a welding wire feeding rate for wire feeding control in which a feeding direction of the consumable welding wire is changed periodically and repeatedly between forward feeding and reverse feeding based on the set welding current;

a frequency setting section for determining a frequency of the welding wire feeding rate based on the set welding current;

a velocity amplitude setting section for determining a velocity amplitude of the welding wire feeding rate based on the set welding current;

a power source for applying electric power to the consumable welding wire to melt the consumable welding wire during the welding;

a switching element for controlling welding output;

a welding voltage detecting section for detecting welding voltage;

a state detecting section for detecting whether the arc welding is in the short circuit state or in the arc generation state based on a result detected by the welding voltage detecting section;

a short circuit control section for controlling a short circuit current during a short circuit period that maintains the short circuit state in response to a short circuit signal fed from the state detecting section; and an arc control section for controlling an arc voltage during an arc period that maintains the arc generation state in response to an arc generation signal fed from the state detecting section, wherein the welding operation is carried out at the welding wire feeding rate including the average feeding rate, the frequency and the velocity amplitude which are determined based on the set welding current which is set prior to the welding operation.

8. The arc welding apparatus of claim 7, wherein the welding wire feeding rate is controlled to feed the consumable welding wire periodically and repeatedly between the forward feeding and the reverse feeding so as to have a trapezoidal waveform, the apparatus further comprising:

a peak time setting section for determining a peak time of the trapezoidal waveform based on the set welding current;

a rising time setting section for determining a rising time of the trapezoidal waveform based on the set welding current; and a falling time setting section for determining a falling time of the trapezoidal waveform based on the set welding current, wherein, welding operation is carried out in a manner that the feeding of the welding wire is timed to at least any one of the peak time, the rising time, and the falling time which are determined based on the set welding current.

9. An arc welding method comprising:

a setting step for setting a set welding current;

a determining step for determining a welding wire feeding rate having an average feeding rate, a frequency and a velocity amplitude; and a welding step for welding with a short-circuit state and an arc generation state repeated periodically by periodically changing wire feeding of a consumable welding wire between forward feeding and reverse feeding at the welding wire feeding rate, electric power being applied to the consumable welding wire to melt the consumable welding wire during the welding, wherein in the determining step, which occurs prior to the welding step, the average feeding rate is determined as a predetermined average feeding rate based on the set welding current in the determining step, which occurs prior to the welding step, the velocity amplitude is determined as a predetermined velocity amplitude based on the set welding current, and in the welding step, welding is performed at the welding wire feeding rate including the predetermined average feeding rate and the predetermined frequency.

10. The arc welding method of claim 9, wherein at least one of an upper limit and a lower limit is set in the predetermined velocity amplitude.

11. The arc welding method of claim 9, wherein the welding wire feeding rate has a sinusoidal waveform.

12. The arc welding method of claim 9, wherein the welding wire feeding rate has a trapezoidal waveform.

13. The arc welding method of claim 12, wherein welding operation is timed to at least any one of a peak time, a rising time, and a falling time of the welding wire feeding rate determined based on the set welding current in the predetermined step.

14. The arc welding method of claim 13, wherein at least one of an upper limit and a lower limit is set in at least any one of the peak time, the rising time, and the falling time.

* * * * *